Nov. 3, 1959　　　C. T. BEAL ET AL　　　2,910,818
ROTARY LAWN MOWER HAVING COLLECTION
MEANS FOR CUTTINGS
Filed Jan. 24, 1958
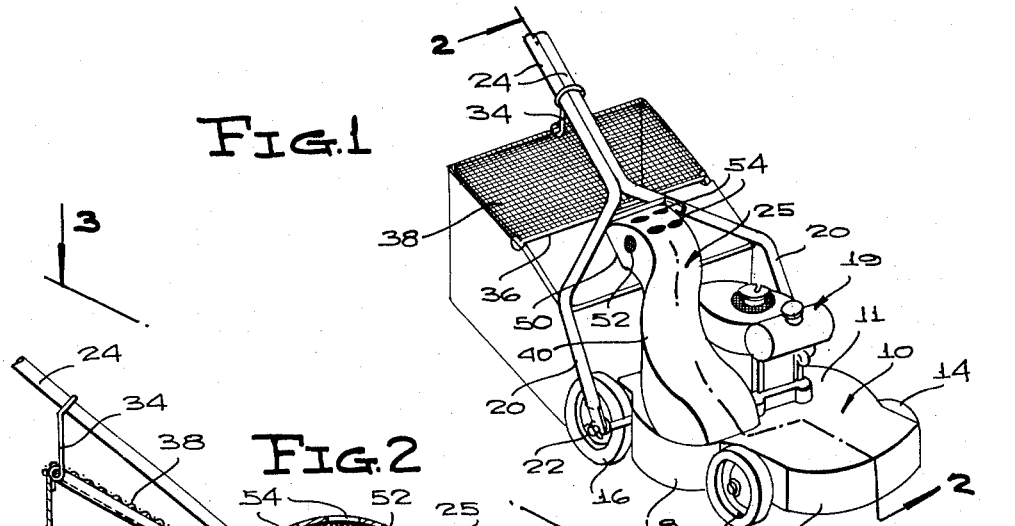
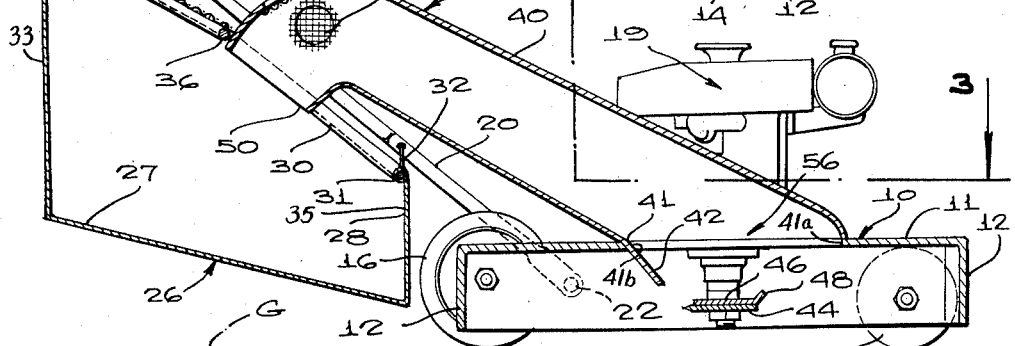
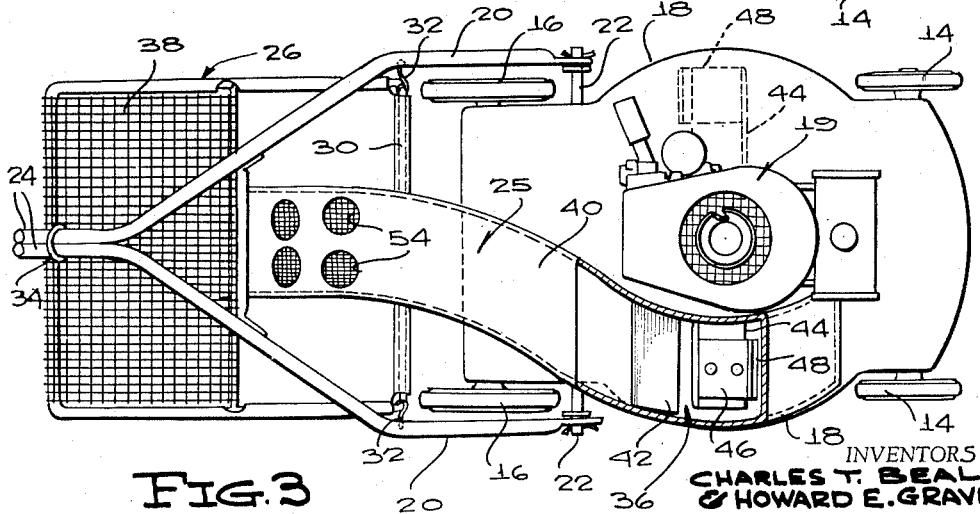
INVENTORS
CHARLES T. BEAL
& HOWARD E. GRAVES
BY
*McMorrow, Berman & Davidson*
ATTORNEYS

United States Patent Office 2,910,818
Patented Nov. 3, 1959

2,910,818

ROTARY LAWN MOWER HAVING COLLECTION MEANS FOR CUTTINGS

Charles T. Beal, San Angelo, Tex., and Howard E. Graves, Roswell, N. Mex.

Application January 24, 1958, Serial No. 711,060

2 Claims. (Cl. 56—25.4)

This invention relates to rotary lawn mowers, generally, and more particularly has reference to a rotary mower having means for collecting grass cuttings, and for moving the same to a catching and storage container.

Heretofore, it has been proposed to provide means for collecting and storing grass cut by rotary type lawn mowers. However, said means has not proven satisfactory, and this is believed due mainly to the fact that they have generally been bulky, and have been poorly arranged. The result has been a loss of efficiency, due to the use of suction fans and other equipment. Further, devices of this type previously in use have been characterized by loss of ability, on the part of the mower, to cut close to objects on one or both sides of the mower. Since this characteristic of a rotary mower is one of the main advantages thereof as compared to the older, reel-type power mower, the grass collecting and ejecting devices heretofore devised for rotary mowers have failed to find commercial success.

In view of the above, it is proposed, in carrying out the present invention, to provide a device for collecting and storing grass cuttings, which will be characterized by its simplicity, its marked efficiency, and its adaptability for association with an otherwise conventional rotary type power mower without detracting from the general efficiency of said mower.

Another object is to provide a device of the character stated which can be incorporated in a power mower of the character described during manufacture thereof, in a manner that will require a minimum of redesign of the mower as presently constructed.

Another object is to provide a device of the character stated which will be compact, relatively light, will have a minimum of parts, will not detract in any way from the maneuverability of the mower or the adaptability of the same to cut close to objects on both sides, and will be adaptable for mounting on rotary mowers that are either gasoline or electric motor driven, and that are either self-propelled or pushed by the user.

Another object is to provide a device of the character stated that will be designed for bringing a particularly arranged conduit into a coactive relationship with cutting blades that are already in use, in a manner such as to cause said cutting blades, conduit, and the particular shape of the blade housing of the mower to produce the effective collection and ejection characteristics of the invention.

Another object is to provide, in association with a device of this character stated, a particularly, novelly designed collection and storage basket, that will hold a large quantity of cuttings in a manner such as to cause the cuttings to be packed firmly in the basket by the pressure under which the cuttings are ejected from the provided conduit, said basket further being designed to insure against any accidental loss of the cuttings from the basket during operation of the mower.

Other objects will appear from the following description, the claims appended thereto, and from the annexed drawing, in which like reference characters designate like parts throughout the several views, and wherein:

Figure 1 is a perspective view of a lawn mower having associated therewith a collection means for grass cuttings, according to the present invention;

Figure 2 is a longitudinal sectional view, on an enlarged scale, taken substantially on line 2—2 of Figure 1; and Figure 3 is a top plan view of the device, as seen from the line 3—3 of Figure 2.

Referring to the drawing in detail, designated at 10 is the downwardly opening blade housing of the rotary mower, said blade housing including a flat top plate or deck 11, integral or otherwise rigid at its periphery with a depending guard flange 12 extending downwardly into closely spaced relation to the ground surface G. The guard flange in the illustrated embodiment is continuous through the full periphery of the blade housing 11, although of course different makes of mowers have different, particular designs of blade housings. In any event, in the illustrated example the blade housing is formed at opposite sides thereof with arcuately, outwardly bowed extensions 18, disposed between the front wheels 14 and the rear wheels 16 of the mower.

Generally designated at 19 is the prime mover or engine, and this of course is wholly conventional. An internal combustion engine is illustrated in the particular example, but of course, an electric motor might be provided, in some mowers, if desired.

The mower is also provided with the handle 20, and in the illustrated example this comprises side-by-side tubular members 24 having divergent front end portions providing a yoke or fork arms, said arms pivoting upon a transverse axis defined by transversely aligned pins 22 projecting laterally outwardly from opposite sides of the mower housing.

The handle members extend in longitudinally contacting relation, and at the rear ends thereof would merge into hand grips, in the usual manner, said hand grips not being shown.

All this is conventional, per se, in a mower and does not constitute in and of itself part of the present invention. The conventional mower construction, however, has a particular, coactive relationship with the grass collecting and ejecting means, as will presently appear.

The grass cuttings collecting and ejecting assembly has been generally designated 25, and in a preferred embodiment would be incorporated in the mower construction during manufacture of the mower. The assembly 25 includes a collection and storage basket 26. The basket 26 has a particular form designed to prevent the grass from being blown out of the same when the grass is ejected from the conduit of the device into the basket in a current of air.

Further, the basket is designed to hold a large quantity of cuttings while they are being packed firmly into the basket by the pressure under which they are ejected from the conduit.

While the basket may vary in dimensions, in the preferred embodiment the basket 26 has a bottom wall 27 which declines slightly in a forward direction. This is integral with a side wall 28. Side wall 28 is highest at the back 33 of the basket, and along the sides of the basket is progressively decreased in height in a forward direction, while at the front of the basket the wall 28 has a relatively low portion 35.

As a result, this provides a basket which opens not only upwardly, but also forwardly. The open top of the basket, as will be noted from Figure 2, is thus somewhat slanted or inclined, in approximate correspondence with the angle of inclination of the handle.

The bottom wall 27 and side wall 28 of the basket are designed for manufacture from any of various materials. In a preferred embodiment, the bottom wall and side wall are of canvas. However, the bottom wall might be made of sheet metal material, as will be readily understood.

In the illustrated example, a peripheral hem 30 is provided, extending continuously along the top edge of the wall 28, and receiving a wire reinforcing frame 31.

Extending upwardly from the front corners of the wire frame are hook-like, wire clips 32, separably connected to the respective fork arms of the handle. Pivotally connected to the wire frame at the back 33 of the basket, medially between opposite sides of the basket, is a larger, hook-like clip or swing hook 34, engageable over the longitudinally contacting portions of the handle members 24.

The particular construction is designed to permit the mower to be tilted backwardly without dragging of the bottom of the basket upon the ground, due to the inclination of the bottom wall. Further, maximum foot clearance is provided for the operator.

Referring to Figures 1 and 2, connected between opposite sides of the wire frame is a cross bar 36, disposed intermediate the front and back walls of the basket, and in the area rearwardly of the cross bar there is mounted, across the open top of the basket, a coarse mesh screen 38, having the adaptability of preventing grass cuttings from blowing out of the basket.

An elongated conduit or chute 40 is of compoundly curved configuration when viewed in top plan, as shown in Fig. 3, so that it has a front end portion mounted upon one side of the mower housing, and curving in approximate correspondence with the curvature of the outwardly bowed flange portion 18 at said side, said curvature also following the arc described by the tips of the blades. The conduit 40 may be formed of sheet metal material or the like, and at its forward, inlet end is tightly fitted in a top opening 41 of the top deck 11 of the blade housing. The outer edge of the opening 41 follows the curvature of the outwardly bowed portion 18 of the flange 12, and the inner edge of the opening 41 extends substantially parallel to the outer edge thereof. The front and back edges 41a, 41b, respectively, of the opening 41 are also substantially parallel, and extend transversely of the mower housing, approximately perpendicularly to the longitudinal center line thereof.

The inlet end of the conduit 40 is formed correspondingly to the openings 41, and as will be noted from Figure 2, at the sides and front of said inlet end, the conduit terminates in the plane of the top wall of the blade housing 11. At the back of the opening 41, however, conduit 40 has a depending, forwardly declining extension or baffle flange 42 projecting downwardly into the housing 10, and terminating at its lower edge just above the plane of rotation of the cutting blades 44 of the mower.

Thus, the extension 42 constitutes a baffle or deflector, designated to cause air currents created by rotation of the blade 44 to be directed upwardly through the conduit 40.

The blade assembly of the mower is also conventional in and of itself, and in the particular type of mower, mounted upon the outer ends of the blades 44 are tip plates 46, having trailing edges 48 that are flanged upwardly as shown in Figure 2. In other makes, the tip plates are attached to body portions of the blades, with the tip plates having sharpened leading edges.

In any event, the particular arrangement illustrated in Figure 2 produces the effective channelling of the air and of the cuttings entrained therein upwardly, rearwardly through the conduit 40. It is found, in practice, that the particular location and angularity of the baffle 42, taken in conjunction with the particular form of the blades including the upwardly flanged trailing edge portions, produces the desired, efficient action.

The conduit, as shown in Figure 3, is of compoundly curved or serpentine formation, with the curvature being sufficiently gradual as not to interfere with the free passage of the cuttings and air therethrough. The trailing end portion of the conduit is disposed substantially medially between opposite sides of the basket, and has a depending outlet portion 50 discharging into the basket immediately in front of the mesh cover 38.

The discharge or rear end portion 50, in its side walls, has comparatively large circular openings 52, which are covered with wire mesh material, and a plurality of openings 54 are provided in the top wall, also covered with screen material.

Four rectangularly spaced openings are provided in the top of the trailing or rear end portion of the conduit, and two in the sides. These provide air vents, permitting some of the air directed through the channel to escape therethrough while preventing the grass from moving out of the conduit except through the outlet.

The air vents result in a reduction in air thrust or pressure at the outlet of the conduit, to prevent the blowing of the grass out of the catching basket as it is ejected from the conduit. In other words, when the grass reaches the downwardly turned portion of the conduit, immediately preliminary to moving into the basket, the grass would of course tend to drop into the basket by gravitational action if there were no air thrust at all. Since the grass is now in a position to gravitate into the basket, the air thrust is measurably reduced, so that the grass drops into the basket comparatively gently, compared to the force with which it would be ejected into the same if there were no predetermined reduction in air pressure resulting from the provision of the vents 52, 54.

The grass, gently dropping into the basket, thus will not blow out of the basket and will tend to pack firmly into the bottom of the basket with minimum agitation of those cutting which have already been discharged thereinto.

It is also to be noted that the conduit is of maximum cross-sectional area at its inlet or throat 56, with said conduit being progressively, gradually tapered in a rearward direction, so as to produce a progessively smaller cross section therein. It has been found that this arrangement prevents any clogging of grass, weeds, or leaves in the conduit. Further, the gradual longitudinal curvature of the conduit shown to best advantage in Figure 3 permits maximum room for the power unit 19, and said unit can be serviced easily, without any interference from the collection assembly.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. For use in a rotary type lawn mower having a blade housing with a discharge opening through a top deck thereof, an upwardly and rearwardly inclined chute in communication with said opening, a collection basket having a top forward portion and a rearward perforate portion, said forward portion having an opening therein receiving the rear end portion of said chute, said chute adjacent said basket having at least one screened vent opening to retard the flow of grass and the like to said basket.

2. A device as defined in claim 1 wherein said chute includes a baffle flange positioned within said blade housing to effectively collect grass for discharge through said opening.

References Cited in the file of this patent

UNITED STATES PATENTS

| | | |
|---|---|---|
| 1,336,257 | Muzzy | Apr. 6, 1920 |
| 2,071,872 | Cockburn | Feb. 23, 1937 |
| 2,641,100 | Sylvester | June 9, 1953 |
| 2,807,126 | Bennett | Sept. 24, 1957 |
| 2,830,428 | Speegle | Apr. 15, 1958 |